United States Patent [19]

Van Eijk

[11] Patent Number: 5,385,742
[45] Date of Patent: Jan. 31, 1995

[54] PROCESS OF MAKING SUBSTRATE-LIMITED DOUGHS

[75] Inventor: Johannes H. Van Eijk, Plein Vogelzang, Netherlands

[73] Assignee: Gist-Brocades N.V., Netherlands

[21] Appl. No.: 125,561

[22] Filed: Sep. 23, 1993

Related U.S. Application Data

[63] Continuation of Ser. No. 985,810, Dec. 3, 1992, abandoned, which is a continuation of Ser. No. 806,693, Dec. 12, 1991, abandoned, which is a continuation of Ser. No. 517,360, May 1, 1990, abandoned.

[30] Foreign Application Priority Data

Feb. 12, 1990 [EP] European Pat. Off. ........... 90200318

[51] Int. Cl.⁶ ............................................. A21D 8/04
[52] U.S. Cl. ......................................... 426/19; 426/20; 426/21; 426/22; 426/27; 426/62
[58] Field of Search ............... 426/19, 20, 21, 22, 426/23, 24, 25, 26, 62, 27

[56] References Cited

U.S. PATENT DOCUMENTS

| | | | |
|---|---|---|---|
| Re. 28,074 | 7/1974 | Smerak et al. | 426/62 |
| 1,232,758 | 7/1917 | Blacklock | 426/21 |
| 2,043,139 | 6/1936 | Wille et al. | 426/20 |
| 2,333,764 | 11/1943 | Burgeson | 426/19 |
| 3,096,178 | 7/1963 | Tucker | 426/62 |
| 3,348,951 | 10/1967 | Evans | 426/21 |
| 3,995,066 | 11/1976 | Muys et al. | 426/62 |
| 4,406,911 | 9/1983 | Larson et al. | 426/19 |
| 4,500,548 | 2/1985 | Silva | 426/19 |
| 4,522,832 | 6/1985 | Morrison | 426/20 |
| 4,693,898 | 9/1987 | Nakatomi et al. | 426/19 |
| 4,950,489 | 8/1990 | Spiller | 426/62 |

OTHER PUBLICATIONS

Pyler, E. J., 1973, Baking Science and Technology, vol. II, pp. 621–624, Siebel Publishing Company, Chicago, Ill.

Tang et al., Quantitative Changes in Various Sugar Concentrations during Breadmaking, Aug. 1972, The Bakers Digest, p. 48.

*Primary Examiner*—Helen Pratt
*Attorney, Agent, or Firm*—Bierman and Muserlian

[57] ABSTRACT

A dough for the preparation of yeast-leavened flour products whereby the dough comprises a yeast not capable of fermenting malto and an amount of sugar(s) fermentable by the yeast wherein the maximal amount of $CO_2$ gas produced during the proof is controlled and limited by the amount of fermentable sugar(s) present in the dough.

10 Claims, No Drawings

PROCESS OF MAKING SUBSTRATE-LIMITED DOUGHS

This application is a continuation of U.S. patent application Ser. No. 985,810, filed Dec. 3, 1992, which is a continuation of U.S. patent Ser. No. 806,693, filed Dec. 12, 1991 which is a continuation of U.S. patent application Ser. No. 517,360, filed May 1, 1990, all now abandoned.

Doughs used for bread making contain levels of fermentable sugar which are much higher than needed for producing the required volume of $CO_2$ gas during the final proof of a bread making process. Since both underproofing and overproofing of doughs will result in inferior bread quality (Pyler: Baking Science and Technology, Siebel Publishing Company, 1973), it is important to strictly control all the variables which affect the rate of gas production in dough.

The current bread making processes show little tolerance towards small changes in process variables such as proof time, proof temperature and yeast dosage, which affect the rate of gas production during proofing. Especially when bread is prepared from retarded doughs which are proofed overnight by increasing the temperature of a cooled dough in a programmable cooling/proofing cabinet, it is not easy to achieve a constant gas production. When frozen dough is used for bread making, there also are serious disadvantages due to instability of the yeast during freezing, frozen storage and thawing (Bruinsma et al, Bakers Digest, Nov. 13, 1984, page 6). Reduction in yeast activity causes a reduction in the volume of the baked bread and the proof time has to be increased to correct for a reduction in yeast activity. The necessary adjustment will vary from case to case depending on factors such as freezing rate, frozen storage time and thawing rate. For the baker, this varying adjustment is undesirable.

Another disadvantage of the frozen dough method is that fast warming up of the dough will result in temperature gradients in the dough causing local overproofing of the exterior of the dough piece. Especially in large dough pieces, this undesirable situation will occur even when the period of proofing is preceded by an overnight thawing period in a refrigerator (2°–4° C.). Since temperature gradients due to a fast warming up have to be avoided during proofing of frozen doughs, long proof times are required even when higher amounts of yeast are applied.

OBJECTS OF THE INVENTION

It is an object of the invention to provide novel doughs for the preparation of yeast-leavened flour products in which the amount of sugar(s) is controlled.

It is another object of the invention to provide am improved method of producing yeast-leavened flour products.

These and other objects and advantages of the invention will become obvious from the following detailed description.

THE INVENTION

The dough of the invention for the preparation of a yeast-leavened flour product comprises yeast and sugar(s) fermentable by the yeast wherein the amount of sugar(s) fermentable by the yeast is limited to control the maximal gas production by the yeast with the yeast consuming substantially all the available fermentable sugar(s) during the fermentation period of the bread making process. Once this amount of sugar has been converted, sufficient $CO_2$ gas is produced to fully proof the dough, and dough volume will not substantially increase upon further extension of the proof time. Bread quality obtained from such doughs shows great tolerance towards large variations in factors determining gas production rate in normal doughs such as dough temperature, yeast dosage or proof time.

Doughs of the invention may be prepared in a manner similar to that used for the preparation of doughs containing conventional ingredients and may be used for the preparation of various lean or rich breads and other farinaceous products which are optionally stored in the frozen state. The farinaceous products of the invention may be used in a conventional manner, and may be baked after purchase, if necessary, after thawing.

Yeasts used in dough exists in several formulations such as cream yeast, compressed yeast or fresh yeast and dried yeast. Dried yeast is available as active dry yeast (ANY) and as instant dry yeast (IDY) having moisture contents of 6 to 8% and 3 to 6% respectively The yeast used in the invention may, for example, conveniently be added to the flour in an amount up to 3% of dry matter (w/w). (w/w) Percentages are based on the flour (100%). Suitable yeasts are selected from the genera *Sacchayomyces* and *Kluyveromyces* for use in the present invention. Advantageously, a strain is selected from *S. cerevisiae*, *S. unisporus*, *S. diarensis*, *S. exiquus* and *S. kluyveri*.

A dough of the invention preferably contains 1 to 3% (w/w) of fermentable sugar, allowing a total maximal gas production of 150–500 ml of $CO_2$ per 100 g of dough. Fermentable sugar(s) as used herein means sugars which may be fermented by the yeast and which may be present in the dough or may be added to the dough or may originate from carbohydrate fractions present in or added to the dough, which are converted during the bread making process into fermentable sugar(s) by enzymes present in or added to the dough.

The flour used in conventional doughs contains about 5% (w/w) of damaged starch which is convertable by the action of $\alpha$- and $\beta$-amylases into maltose. If the formed maltose (in a lean dough) is completely fermented by the yeast, about 1000 ml of $CO_2$ gas will be produced in 100 g of dough. This is about 5 times as much as is required to obtain a desirable proof height and consequently an optimal loaf volume after baking.

According to one embodiment of tile invention, a flour is used with a level of less than 2%, preferably 0.1 to 1%, more preferably 0.1 to 0.5% (w/w) of damaged starch. This flour allows a maximal gas production of about 200 ml of $CO_2$ per 100 g of dough, originating from the glucofructosan fraction and the reduced amount of damaged starch.

Another way of reducing the amount of fermentable sugar available is the use of a sponge and dough process in which the yeast ferments the fermentable sugar in the bulk of the flour at the sponge stage. In this way, the amount of fermentable sugar(s) is reduced by a prefermentation step on a substantial part of the flour. Then, the remainder of the flour is added and mixed into a dough containing a reduced and limited amount of fermentable sugar. This sponge and dough process can be advantageously applied with regular bakers yeast to control the amount of fermentable sugar in the dough.

The invention further provides a dough which comprises a yeast which is not capable of fermenting part of the sugars present in the dough, preferably maltose or maltose and sucrose. In the case of incapability of fermenting maltose, the maltose originating from the damaged starch fraction of the flour cannot be used by the yeast for the $CO_2$ production. The amount of gas produced is controlled by fermentation of other sugars present (mainly glucofructosans), or added to the dough. Accordingly to another aspect of the invention, a yeast is used in a dough which comprises added sugar(s) as the only sugar(s) that can be fermented by the yeast.

Advantageously, the volume of the baked product can be chosen in advance by controlling the (maximal) gas production. Once all fermentable sugars in the dough have been fermented and have produced the desired volume of $CO_2$ required for fully proofing the dough, proof time may be extended without causing serious overproofing of the dough. Such doughs provide great flexibility during bread making since the fully proofed doughs can be kept for considerable lengths of time in a proofing cabinet before being baked into bread. Moreover, the (maximal) amount of $CO_2$ produced in such dough depends only on the amount of fermentable sugars present in or added to the dough and is hardly influenced by factors controlling the rate of gas production such as yeast dosage or dough temperature.

Another advantage of the invention is that the sweet taste of the baked product can also be controlled. Since the entire amount of fermentable sugars present in the dough will by the invention be consumed by the yeast, non-fermentable sugars can be used for adjusting the sweetness of the baked product. When, for example, a maltase and invertase deficient yeast is used, saccharose, maltose and glucofructosans in the dough are not fermented and will contribute to the sweetness of the bread product. When regular bakers yeast is used, artificial sweeteners and non-fermentable sweet sugars can be used to improve and adjust the sweetness of the baked product. Examples of useful additives for controlling sweetness are artifical sweeteners like aspartame (Nutrasweet TM), lactose (or whey permeate) and isomaltulose (Palatinit TM). Generally, 0.1 to 10% of such non fermentable sugars will be present in or may be added to the dough.

Frozen doughs having the composition of the invention have additional advantages. First of all, a reduction of the yeast activity due to a freeze/thaw cycle will no longer affect the volume of the baked product provided that sufficient time has been given to the (residual) yeast for a complete conversion of all fermentable sugars in the dough into $CO_2$ gas. Moreover, the critical overnight thawing method at 2° to 4° C., followed by a proof at 30° to 40° C., can be replaced by a flexible overnight thawing/proofing method at ambient temperature (20° to 30° C.). By using this method, the baker will have fully proofed doughs at his disposal early in the morning and these doughs can be baked off into bread products of constant quality at any moment during the rest of the day.

It is also possible to obtain fully proofed substrate-limited doughs directly from frozen doughs by using a rapid thawing/proofing method which is not applicable for normal doughs. When normal doughs are rapidly thawed and proofed, temperature gradients will occur resulting in a local overproofing of the outside part of the dough pieces. This undesirable situation is prevented when using substrate-limited doughs of the invention, even when large dough pieces are rapidly thawed and proofed. Also the period of time for the thawing and especially for the proofing is now not critical anymore because the gas production will stop when all the fermentable sugars are converted. Because in this method, the volume of $CO_2$ gas produced depends on a limited amount of fermentable sugar in the dough, the frozen dough method is very flexible and is suited for the home baked goods market.

Another advantage is that the frozen doughs can be thawed and proofed in large numbers at the same time, whereas the fully proofed doughs can be stored and baked later on in smaller quantities at any moment during the rest of the day. In this way, it is possible to sell freshly baked goods all day long. This advantage also applies for fresh doughs which are prepared early in the morning and which can be baked at any moment during the rest of the day as the volume of the fully proofed dough will not substantially increase during the rest of the day.

The present invention may also be applied to the retarded dough method in which retarded doughs are used by some bakers to avoid night work. According to the retarded dough method, cooled doughs are proofed during the night in a programmable cooling/proofing room. The next morning, the doughs are ready for baking and early in the morning, fresh bread is available. According to the invention, the production of $CO_2$ gas can be controlled by limiting the amount of fermentable sugar instead of controlling the temperature and time. Moreover, the doughs can be stored and baked afterwards at any moment during the rest of the day.

The invention is useful not only for bread making, but also for preparing all kinds of yeast-leavened bakery products such as pizzas, croissants and doughnuts.

In the following examples there are described several preferred embodiments to illustrate the invention. However, it is to be understood that the invention is not intended to be limited to the specific embodiments.

EXAMPLE 1

The contents of a flour (Apollo) obtained from Stolp & Co., Bunschoten, The Netherlands and their contribution to the gas production in dough are given in Table 1.

TABLE 1

| % in flour | Fraction | ml of $CO_2$/100 g of dough |
|---|---|---|
| 0.15 | glucose invertase | 25 |
| 1 | glucofructosans ⟶ glucose + fructose | 155 |
| 5 | $\alpha + \beta$ amylase damaged starch ⟶ maltose | 780 |
| | total | 960 |

During the final proof of the bread making process, only about 200 ml of $CO_2$/100 g of dough are required to fully proof a dough. When conventional baker's yeast was used, about 5 times as much gas was formed as was necessary (see Table 1:960 ml of $CO_2$/100 g of dough). Using the same dough, a smaller amount of gas was produced by choosing a yeast which ferments only the glucose and fructose and which was not capable of fermenting maltose.

A dough formulation was prepared of the following composition

| Formulation | |
|---|---|
| Flour (Apollo) | 100% |
| Water | 56% |
| Instant dry yeast (S. cerevisiae V 328 CBS 108.90) | 2% |
| Salt | 2% |

| Procedure | |
|---|---|
| Mixing time | 6 minutes at 52 r.p.m. (pin mixer) |
| Dough temperature | 30° C. |
| Scaling weights | 50 g of dough pieces |
| Gassing power measurements: | 30° C. |

| | Result | |
|---|---|---|
| Hours | Total ml | ml/h |
| 0 | 0 | 0 |
| 0.5 | 20 | 40 |
| 1.5 | 120 | 100 |
| 3 | 150 | 20 |
| 6 | 200 | 17 |
| 12 | 250 | 8 |
| 18 | 300 | 8 |
| 24 | 350 | 8 |

The yeast strain used for this experiment was a maltose adaptive (MAL+/−) instant dry yeast strain, which behaves as a MAL− strain (MAL− = not fermenting maltose), when added in dosages above 1.5% to flour. When added in a dosage of 2% (w/w), about 120 ml of $CO_2$ gas was produced mainly from the glucofructosan fraction within 1.5 hours at 30° C. Thereafter, the gas production rate dropped sharply and only about 8 ml of $CO_2$ was produced per hour in a 50 g dough piece.

In gassing power tests, similar results were obtained when replacing the 2% S. cerevisiae V 328 CBS 108.90 instant dry yeast (MAL+/− = maltose adaptive) with 2% of compressed yeast of one of the following sucrose (= saccharose) fermenting and maltose non-fermenting (SUC+/MAL−) yeast strains:

| S. cerevisiae D2 | (CBS 109.90) |
|---|---|
| S. cerevisiae DS 10638 | (CBS 110.90) |
| S. cerevisiae DS 16887 | (CBS 111.90) |
| S. exiquus V 04 | (CBS 112.90) |
| S. exiquus 8130 | (CBS 8130) |
| S. kluyveri 4798 | (CBS 4798) |
| S. kluyveri 6545 | (CBS 6545) |
| S. kluyveri 6626 | (CBS 6626) |

EXAMPLE 2

Table 2 shows the results of gassing power tests with 100 g dough pieces containing 2% of compressed yeast of a sucrose (=saccharose) and maltose non-fermenting yeast (SUC−/MAL−) strain S. unisporus 398 (CBS 398). From this Table, it can be concluded that hardly any $CO_2$ gas was produced during fermentation (50 ml of $CO_2$/100 g of dough after 4 hours of fermentation). Addition of 1.1% readily fermentable glucose resulted in a rapid production of about 130 ml of $CO_2$ gas within 2 hours of fermentation. Thereafter, the $CO_2$ gas production dropped sharply. Hardly any additional gas production was observed after the addition of 0.95% saccharose which cannot be fermented by this this yeast strain. Therefore, readily fermentable glucose (or fructose) can be used for controlling the amount of gas produced, whereas non-fermentable saccharose can be used for controlling sweetness of bakery products produced from these doughs. Similar results were obtained using one of the following SUC−/MAL− strains:

| S. unisporus 398 | (CBS 398) |
|---|---|
| S. diarensis 4309 | (CBS 4309) |
| S. diarensis 6463 | (CBS 6463) |
| S. cerevisiae DS 16887 | (CBS 111.90) |

TABLE 2

| strain S. unisporus 398 (CBS 398) | | | | | | |
|---|---|---|---|---|---|---|
| | Dough | | 1.1% Dextrose | | 0.95% Saccharose | |
| min | total mls | mls/15 min | total mls | mls/15 min | total mls | mls/15 min |
| 0 | 0.0 | 0.0 | 0.0 | 0.0 | 0.0 | 0.0 |
| 30 | 5.0 | 2.4 | 27.4 | 19.3 | 5.2 | 2.7 |
| 60 | 9.2 | 2.6 | 81.2 | 27.8 | 9.9 | 2.4 |
| 90 | 14.5 | 3.2 | 119.8 | 14.4 | 17.1 | 3.8 |
| 120 | 21.3 | 3.6 | 134.5 | 6.3 | 25.9 | 4.6 |
| 150 | 28.5 | 3.8 | 145.3 | 5.3 | 35.0 | 4.6 |
| 180 | 36.0 | 3.6 | 153.9 | 4.0 | 44.5 | 4.6 |
| 210 | 43.4 | 3.6 | 162.4 | 4.3 | 54.2 | 4.9 |
| 240 | 49.9 | 2.9 | 170.0 | 4.0 | 63.3 | 4.7 |

EXAMPLE 3

For demonstrating the principle of the invention, a model dough with a limited amount of fermentable sugar was prepared by mixing regular bakers yeast (SUC+/MAL+), gluten, starch and sugar into a dough.

| Formulation | |
|---|---|
| Native wheat starch (Roquette) | 85% |
| Gluten (Gluvital) | 15% |
| Xanthan gum (Keltrol F) | 0.5% |
| Glucose | 1.2% |
| Salt | 2% |
| Shortening | 0.5% |
| Water | 57% |
| Ascorbic acid | 100 ppm |
| Fungal α-amylase | |
| P200 (Gist-brocades) | 100 ppm |
| Grindamyl (Grinsted) | 300 ppm |
| $NH_4Cl$ | 300 ppm |
| $NaH_2PO_4.H_2O$ | 375 ppm |
| Fermipan ™ | 1% or 2% |

-continued

Formulation (Instant dry yeast from Gist-brocades)

Procedure

| | |
|---|---|
| Mixing time | 10 minutes, 52 r.p.m. (pin mixer) |
| Dough temperature | 28° C. |
| Scaling weights | 150 g (pup loaves) |
| Bench time | 20 minutes at room temperature |
| Proof time | 1, 2 or 3 hours at 30° C. |

Results

TABLE 3

| % Fermipan | Final proof time (hours) | Proof height (mm) | Loaf volume (ml) |
|---|---|---|---|
| 1 | 1 | 59 | 445 |
| 1 | 2 | 90 | 527 |
| 1 | 3 | 89 | 517 |
| 2 | 1 | 86 | 535 |
| 2 | 2 | 92 | 529 |
| 2 | 3 | 90 | 520 |

From the results of Table 3, it can be concluded that the limited amount of fermentable sugar in these doughs was consumed within 1 hour when 2% of Fermipan was used and within 2 hours when 1% of Fermipan was used. The proof heights and loaf volumes were nearly constant and did not depend on proof time or yeast dosage once the fermentable sugars were converted into $CO_2$ gas.

EXAMPLE 4

A sponge and dough procedure was also used for reducing the amount of sugars fermentable by regular bakers yeast (SUC+/MAL+).

Formulation

Sponge

| | |
|---|---|
| Flour | 70% |
| Water | 53% |
| Salt | 2% |
| Fungal α-amylase P200 (Gist-brocades) | 250 ppm |
| Koningsgist TM (compressed yeast from Gist-brocades) | 5% |

Dough

| | |
|---|---|
| Sponge containing | 70% of flour |
| Shortening | 0.5% |
| Ascorbic acid | 100 ppm |
| Flour | 30% |

Sponge

| | |
|---|---|
| Mixing time | 3 minutes 52 r.p.m. (pin mixer) |
| Dough temperature | 28° C. |
| Fermentation | 3 hours at 30° C. |

Dough

| | |
|---|---|
| Mixing time | 3 minutes 52 r.p.m. (pin mixer) |
| Dough temperature | 30° C. |
| Scaling weights | 150 g (pup loaves) |
| Bench time | 20 minutes at room temperature |
| Proof time | 1-3 hours at 30° C. |

TABLE 4

| Flour in Sponge % | Proof time (hours) | Proof height (mm) | Loaf Volume (ml) |
|---|---|---|---|
| 70 | 1 | 85 | 598 |
| 70 | 1.5 | 85 | 570 |
| 70 | 2 | 92 | 598 |
| 70 | 3 | 97 | 637 |

From Table 4, it can be concluded that within 1 hour proof time all fermentable sugars in the dough were converted into $CO_2$ gas. Proof heights and loaf volumes remained nearly constant when extending the final proof time up to 3 hours.

EXAMPLE 5

When using regular wheat flour containing about 5% of damaged starch, a maltose non-fermenting yeast strain (MAL−) was used for reducing the amount of $CO_2$ gas produced to time desired level.

Formulation

| | |
|---|---|
| Flour | 100% |
| Water | 53% |
| Salt | 2% |
| Fungal α-amylase P200 (Gist-brocades) | 50 ppm |
| Shortening | 0.5% |
| Ascorbic acid | 100 ppm |
| Yeast | 2% instant dry |
| S. cerevisiae V 328 (CBS 108.90) | (MAL+/−) |
| | or |
| | 2% compressed |
| S. cerevisiae D2 (CBS 109.90) | (SUC+/MAL−) |
| | or |
| | 2% compressed |
| S. cerevisiae DS 16887 (CBS 111.90) | (SUC−/MAL−) |
| | or |
| | 2% compressed |
| S. cerevisiae DS 16887 (CBS 111.90) | +1% glucose |

Procedure

| | |
|---|---|
| Mixing time | 6 minutes at 52 r.p.m. (pin mixer) |
| Dough temperature | 28° C. |
| Scaling weights | 150 g (pup loaves) |
| Bench time | 30 minutes at room temperature |
| Proof time | 70-340 minutes at 30° C. |

TABLE 5

| Leavener | Proof time (min) | Proof height (mm) | Loaf volume (ml) |
|---|---|---|---|
| 2% instant dry yeast (S. cerevisiae V 328 CBS 108.90) | 70 | 60 | 486 |
| 2% instant dry yeast (S. cerevisiae V 328 CBS 108.90) | 170 | 71 | 519 |
| 2% instant dry yeast (S. cerevisiae V 328 CBS 108.90) | 220 | 70 | 508 |

TABLE 5-continued

| Leavener | Proof time (min) | Proof height (mm) | Loaf volume (ml) |
|---|---|---|---|
| 2% instant dry yeast (*S. cerevisiae* V 328 CBS 108.90) | 290 | 75 | 494 |
| 2% instant dry yeast (*S. cerevisiae* V 328 CBS 108.90) | 340 | 75 | 497 |
| 2% compressed yeast (*S. cerevisiae* D2 CBS 109.90) | 170 | 67 | 490 |
| 2% compressed yeast (*S. cerevisiae* D2 CBS 109.90) | 255 | 70 | 504 |
| 2% compressed yeast (*S. cerevisiae* D2 CBS 109.90) | 340 | 73 | 495 |
| 2% compressed yeast (*S. cerevisiae* DS 16887 CBS 111.90) | 170 | 36 | 210 |
| 2% compressed yeast (*S. cerevisiae* DS 16887 CBS 111.90) | 255 | 39 | 225 |
| 2% compressed yeast (*S. cerevisiae* DS 16887 CBS 111.90) | 340 | 43 | 240 |
| 2% compressed yeast (*S. cerevisiae* DS 16887 CBS 111.90) + 1% glucose | 170 | 65 | 496 |
| 2% compressed yeast (*S. cerevisiae* DS 16887 CBS 111.90) + 1% glucose | 255 | 73 | 510 |
| 2% compressed yeast (*S. cerevisiae* DS 16887 CBS 111.90) + 1% glucose | 340 | 72 | 508 |

From the results given in Table 5, it can be concluded that variation in proof time from 170 to 340 minutes hardly influenced proof heights and loaf volumes when using *S. cerevisiae* V 328 (CBS 108.90) (SUC+/MAL−at 2% dosage) or *S. cerevisiae* D2 (CBS 109.90) (SUC+/MAL−). When using *S. cerevisiae* DS 16887 (CBS 111.90) (SUC+/MAL+), hardly any $CO_2$ gas was produced resulting in a low loaf volume. When supplying this yeast strain with a readily fermentable sugar (1% glucose), proof heights and loaf volumes increased to normal levels and were hardly affected when extending the proof time from 170 to 340 minutes.

EXAMPLE 6

A dough of the following composition was prepared and stored in the refrigerator.

| Recipe | |
|---|---|
| Flour | 100% |
| Water | 53% |
| Salt | 2% |
| Instant dry yeast *S. cerevisiae* V 328 (CBS 108.90) | 2% |
| Fungal α-amylase P200 (Gist-brocades) | 150 ppm |
| Ascorbic acid | 100 ppm |

| Procedure | |
|---|---|
| Mixing time | 6 minutes at 52 r.p.m. (pin mixer) |
| Dough temperature | 20° C. |
| Scaling weights | 150 g (pup loaves) |
| Bench time | 30 minutes at room temperature |
| Proof time | 1.5 hours at 30° C. |
| Cooling/storage | 0–6 hours at 2–4° C. (refrigerator) |

The results of time baking tests in Table 6 show that low temperature doughs which have been stored in the refrigerator for 0–6 hours gave a constant proof height after proofing for 1.5 hours and a constant loaf volume after baking. Such a procedure allows a baker to prepare bread from doughs which have a long shelf life in the refrigerator, and can be baked into bread of constant quality after a proof time that is not very critical.

TABLE 6

| Storage time at 2–4° C. before printing (hours) | Proof height (mm) | Loaf volume (ml) |
|---|---|---|
| 0 | 68 | 469 |
| 1 | 72 | 493 |
| 2 | 70 | 500 |
| 4 | 75 | 496 |
| 6 | 78 | 510 |

EXAMPLE 7

Frozen doughs of the following composition were prepared by the following procedure.

| Recipe | |
|---|---|
| Flour | 100% |
| Water | 52% |
| Salt | 2% |
| Instant dry yeast *S. cerevisiae* V 328 (CBS 108.90) | 2% |
| Fungal α-amylase P200 (Gist-brocades) | 150 ppm |
| Ascorbic acid | 100 ppm |

| Procedure | |
|---|---|
| Mixing time | 6 minutes at 52 r.p.m. (pin mixer) |
| Dough temperature | 20° C. |
| Scaling weights | 150 g (pup loaves) |
| Bench time | 30 minutes at room temperature |
| Freezing | 1 hour at −20° C. |
| Frozen storage | 1 or 2 days at −20° C. |
| Thawing/Proofing procedure I | overnight (18 hours) at 2–4° C. + 1–3 hours at 40° C. |
| Thawing/Proofing procedure II | 0.5–3 hours at 40° C. |

TABLE 7

| Thawing/Proofing procedure | Proof height (mm) | Loaf volume (ml) |
|---|---|---|
| 18 h at 2–4° C. + 1 h at 40° C. | 67 | 483 |
| 18 h at 2–4° C. + 1.5 h at 40° C. | 70 | 495 |
| 18 h at 2–4° C. + 2 h at 40° C. | 75 | 509 |
| 18 h at 2–4° C. + 3 h at 40° C. | 77 | 500 |
| 0.5 h at 40° C. | 40 | 250 |
| 1 h at 40° C. | 45 | 350 |
| 1.5 h at 40° C. | 65 | 490 |
| 2 h at 40° C. | 70 | 510 |
| 3 h at 40° C. | 77 | 500 |

The baking results in Table 7 indicate that a proof time extension from 1 to 3 hours at 40° C. hardly affected loaf volume and proof height of frozen doughs that were thawed overnight in a refrigerator. When the overnight thawing step was omitted, a constant maximal proof height and loaf volume was attained after a proof time of about 1.5 hours. The rapid thawing/proofing procedure at elevated temperature (40° C.) did not result in an irregular proofing of the doughs. Thus, the local overproofing of the outside parts of the dough which is caused by temperature gradients during thawing/proofing was avoided when using doughs containing a limited amount of fermentable substrate.

EXAMPLE 8

Dough formulations of time following compositions were prepared.

|  | Recipe | | |
| --- | --- | --- | --- |
|  | A | B | C |
| Flour (Apollo) | 100% | 100% | 100% |
| Water | 56% | 56% | 56% |
| Instant dry yeast S. cerevisiae | 2% | 2% | 2% |
| V 328 (CBS 108.90) | 2% | 2% | 2% |
| Salt | 2% | 2% | 2% |
| Lactose | — | 3% | — |
| Ascorbic acid | 100 ppm | 150 ppm | 100 ppm |
| Shortening (ADM) | 1% | — | 0.2% |
| Sodium stearoyl-2-lactylate | — | 0.5% | 0.3% |
| Fungal α-amylase P200 (Gist-brocades) | — | 100 ppm | 100 ppm |
| Grindamyl S100 (Grindsted Products) | — | 300 ppm | 300 ppm |
| Xanthan gum | — | 0.5% | — |

| Procedure | |
| --- | --- |
| Mixing time | 6 minutes at 52 r.p.m. (pin mixer) |
| Dough temperature | 20° C. |
| Scaling weights | 525 g |
| Bench time | 25 minutes at 28° C. |
| Freezing | 100 minutes at −35° C. |
| Storage | 1 day or 5 weeks at −20° C. |
| Thawing/Proofing procedure I | 19, 20, 21, 22, 23, 24, 25 hours at 25° C. |
| Thawing/Proofing procedure II | 19 hours (overnight) at 2–4° C. followed by 3, 4, 5, 6 hours at 30° C. |

TABLE 8

| Thawing/proofing | | Storage time (days at −20° C.) | Proof height (mm) | Loaf Volume (ml) | Proof height (mm) | Loaf Volume (ml) |
| --- | --- | --- | --- | --- | --- | --- |
| Procedure I | | | Composition A | | Composition B | |
| 19 h at 25° C. | (overnight) | 1 | 83 | 1900 | 102 | 2250 |
| 20 h | (+1 h) | 1 | 87 | 1950 | 108 | 2250 |
| 21 h | (+2 h) | 1 | 86 | 2050 | 109 | 2250 |
| 22 h | (+3 h) | 1 | 88 | 2050 | 109 | 2300 |
| 23 h | (+4 h) | 1 | 90 | 2100 | 113 | 2300 |
| 24 h | (+5 h) | 1 | 91 | 2000 | 112 | 2350 |
| Procedure I | | | Composition C | | Composition B | |
| 19 h at 25° C. | (overnight) | 1 | 88 | 2050 | 102 | 2250 |
| 21 h | (+2 h) | 1 | 93 | 2000 | 109 | 2250 |
| 23 h | (+4 h) | 1 | 93 | 2000 | 113 | 2300 |
| 25 h | (+6 h) | 1 | 95 | 2050 | 108 | 2300 |
| 19 h at 25° C. | (overnight) | 35 | 89 | 2050 | 98 | 2200 |
| 21 h | (+2 h) | 35 | 95 | 2100 | 104 | 2200 |
| 23 h | (+4 h) | 35 | 95 | 2000 | 105 | 2250 |
| 25 h | (+6 h) |  | 97 | 2050 | 111 | 2200 |

TABLE 9

| Thawing/proofing | | Storage time (days at −20° C.) | Proof height (mm) | Loaf Volume (ml) | Proof height (mm) | Loaf Volume (ml) |
| --- | --- | --- | --- | --- | --- | --- |
| Procedure II | | | | | Composition B | |
| 19 h at 2–4° C. | (overnight) | 1 | | | 100 | 2200 |
| 22 h | (+3 h at 30° C.) | 1 | | | 103 | 2200 |
| 23 h | (+4 h at 30° C.) | 1 | | | 105 | 2200 |
| 24 h | (+5 h at 30° C.) | 1 | | | 104 | 2200 |
| 25 h | (+6 h at 30° C.) | 1 | | | 108 | 2250 |

The baking results of the doughs of Table 8 show that the different thawing/proofing procedures did result in a constant bread quality with respect to the bread volume. The bread volume was hardly influenced by the point of time at which the fully proofed doughs were baked. Also, the storage time in the freezer did not influence the bread volume. Even if yeast activity would have been partly lost during frozen storage of the dough, all fermentable sugars were still completely converted into $CO_2$ gas if proof times were long enough. Thus, loaf volumes in this bake-off system were hardly affected by variations in the period of storing the frozen doughs in the freezer. The fully proofed doughs could be kept for a long time (at least 6 hours) but not unlimited at 30° C.

The addition of lactose (composition B) gave the bread a somewhat sweeter taste (lactose was not fermented by the yeast). Xanthan gum (composition B) was added to improve the crumb structure of bread in this bake-off system.

Various modifications of the products and processes of the invention may be made without departing front the spirit or scope thereof and it is to be understood that the invention is intended to be limited only as defined in the appended claims.

What I claim is:

1. In a process for the preparation of yeast-leavened bread products from a bread dough containing yeast and fermentable sugars, the improvement comprising preparing a bread dough for a yeast-leavened bread product containing a yeast, which yeast consists of a yeast not capable of fermenting maltose and sugar(s) fermentable by the yeast whereby the amount of sugar(s) fermentable by the yeast is limited to control maximal gas production by the yeast and fermenting the dough in which substantially all available fermentable sugar is consumed by the yeast to form the yeast-leavened product.

2. A process of claim 1 wherein at least part of the sugar(s) to be fermented by the yeast originates from carbohydrates in the dough which are converted by enzymes in the dough during a bread making process into sugar(s) fermentable by the yeast.

3. A process of claim 1 wherein the amount of sugars fermentable by the yeast is 1 to 3 w/w % calculated on the amount of flour.

4. A process of claim 1 wherein the dough comprises a flour which contains less than 2% by weight of damaged starch.

5. A process of claim 1 further containing 0.1 to 10% by weight of non-fermentable sugar(s).

6. A process of claim 5 wherein the non-fermentable sugar(s) are lactose or whey permeate.

7. A process of claim 1 further containing 0.1 to 2% by weight of xanthan gum.

8. A dough of claim 1 wherein carbohydrate(s) are added to the dough as the only source of sugar that can be fermented by the yeast.

9. A process of claim 1 wherein the yeast is a *Saccharomyces* or *Kluyveromyces*.

10. A process of claim 9 wherein the yeast is selected from the group consisting of *S. cerevisiae, S. unisporus, S. diarensis, S. exiquus* and *S. kluyveri*.

* * * * *